(12) United States Patent
Ren

(10) Patent No.: US 9,179,171 B2
(45) Date of Patent: Nov. 3, 2015

(54) CONTENT RECOMMENDATION FOR A UNIFIED CATALOG

(75) Inventor: Dahai Ren, Lincoln, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 319 days.

(21) Appl. No.: 13/307,028

(22) Filed: Nov. 30, 2011

(65) Prior Publication Data

US 2013/0139191 A1 May 30, 2013

(51) Int. Cl.
*H04N 5/445* (2011.01)
*H04N 21/2543* (2011.01)
*H04N 21/254* (2011.01)
*H04N 21/2665* (2011.01)
*H04N 21/442* (2011.01)
*H04N 21/472* (2011.01)
*H04N 21/478* (2011.01)
*H04N 21/482* (2011.01)
*H04N 21/658* (2011.01)

(52) U.S. Cl.
CPC ....... *H04N 21/2543* (2013.01); *H04N 21/2541* (2013.01); *H04N 21/2665* (2013.01); *H04N 21/44222* (2013.01); *H04N 21/47202* (2013.01); *H04N 21/47815* (2013.01); *H04N 21/4826* (2013.01); *H04N 21/6582* (2013.01)

(58) Field of Classification Search
CPC .................... H04N 21/4532; H04N 21/44222; H04N 21/482; H04N 5/44543; H04N 7/163; H04N 21/2543; H04N 21/2541; H04N 21/2665; H04N 21/47202; H04N 21/47815; H04N 21/4826; H04N 21/6582

USPC .......................................................... 725/46
See application file for complete search history.

(56) References Cited

U.S. PATENT DOCUMENTS

| | | | |
|---|---|---|---|
| 5,758,257 A * | 5/1998 | Herz et al. .................... 725/116 |
| 6,057,872 A * | 5/2000 | Candelore ........................ 725/23 |
| 6,457,010 B1 * | 9/2002 | Eldering et al. ...................... 1/1 |
| 7,194,757 B1 * | 3/2007 | Fish et al. ...................... 725/121 |
| 8,171,509 B1 * | 5/2012 | Girouard et al. ................ 725/32 |
| 8,381,241 B2 * | 2/2013 | Ramaswamy et al. .......... 725/14 |

(Continued)

OTHER PUBLICATIONS

Nielsen, Paul, et al. Microsoft SQL Server 2008 Bible. Indianapolis: John Wiley & Sons. 2009.*

(Continued)

*Primary Examiner* — Nasser Goodarzi
*Assistant Examiner* — Michael B Pierorazio

(57) ABSTRACT

A method includes identifying a unified catalog of content. The unified catalog of content includes digital content available to order and physical content available to order. The method includes identifying a digital content identifier for each asset of the digital content available to order from the unified catalog. The method also includes identifying a physical content identifier for each asset of the physical content available to order from the unified catalog. An indication of user activity from a user device is received. The method further includes determining one or more content recommendations based on the unified catalog and the indication of user activity. The one or more content recommendations are provided to the user device. A content selection based on the one or more content recommendations is received. The method also includes routing an order for the selected content based on an identifier associated with the selected content.

20 Claims, 11 Drawing Sheets

(56) References Cited

U.S. PATENT DOCUMENTS

| | | | |
|---|---|---|---|
| 8,478,664 B1* | 7/2013 | Xavier et al. | 705/26.7 |
| 2002/0108114 A1* | 8/2002 | Shinohara et al. | 725/46 |
| 2002/0138848 A1* | 9/2002 | Alao et al. | 725/109 |
| 2004/0079798 A1* | 4/2004 | Messenger et al. | 235/381 |
| 2005/0091069 A1* | 4/2005 | Chuang | 705/1 |
| 2005/0193416 A1* | 9/2005 | Przybylek | 725/53 |
| 2007/0214473 A1* | 9/2007 | Barton et al. | 725/28 |
| 2008/0092181 A1* | 4/2008 | Britt | 725/87 |
| 2010/0030808 A1* | 2/2010 | Ress et al. | 707/104.1 |
| 2010/0158101 A1* | 6/2010 | Wu et al. | 375/240.01 |
| 2010/0161825 A1* | 6/2010 | Ronca et al. | 709/231 |
| 2010/0205541 A1* | 8/2010 | Rapaport et al. | 715/753 |
| 2013/0145383 A1* | 6/2013 | Hao et al. | 725/1 |

OTHER PUBLICATIONS

Rankins, Ray, et al. Microsoft SQL Server 2008 Unleashed. Sams. 2010.*

CableLabs VOD Content Specification Version 1.1: Metadata Specifications. Cable Television Laboratories, Inc. 2006.*

* cited by examiner

| CID | TITLE | DCID | PCID |
|---|---|---|---|
| C1 | NO CLUE | A1 | |
| C2 | WANTED | A2 | |
| C3 | FIRE! | A3 | |
| C4 | APPLE PIE | A4 | B3 |
| C5 | MAGIC STORY | A5 | |
| C6 | WAR STORY | A6 | B1 |
| C7 | HAPPY JOY | A7 | B2 |
| C8 | 3 KILLERS | A8 | B4 |
| C9 | WISH I MAY | | |
| C10 | BLUE PEOPLE | | B5 |

FIG. 6A

CONTENT RECOMMENDATION FOR A UNIFIED CATALOG

BACKGROUND

Multi-screen video architecture generally provides cross-platform access to a single content source. Among other benefits, multi-screen video provides consumers the possibility to watch video on a screen/device of their choice. For example, a live broadcast television event may also be available for viewing on various types of mobile devices.

BRIEF DESCRIPTION OF THE DRAWINGS

FIG. 6A is a diagram of an exemplary table of a unified catalog;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide recommendations for a cross-platform system that includes online digital streaming/downloads and distribution of physical content, such as DVDs, Blu-ray discs, or memory cards. Recommendations, such as a recommendation list, may be provided to users based on a user's consumption history, personal preferences, and feedback provided through a user device. Responses to recommendations may be routed to appropriate providers of digital content or physical content in the cross-platform system.

Consistent with the embodiments described herein, the recommendations may be adjusted based on the status of resources associated with providing the recommended content. For example, physical content may be unavailable from physical stores/kiosks within a predetermined distance of a location associated with the user, such as a user's home address or the current global positioning system (GPS) location. A ranking of the recommended content may be lowered or the recommended content may be removed from the list.

Figure 1:
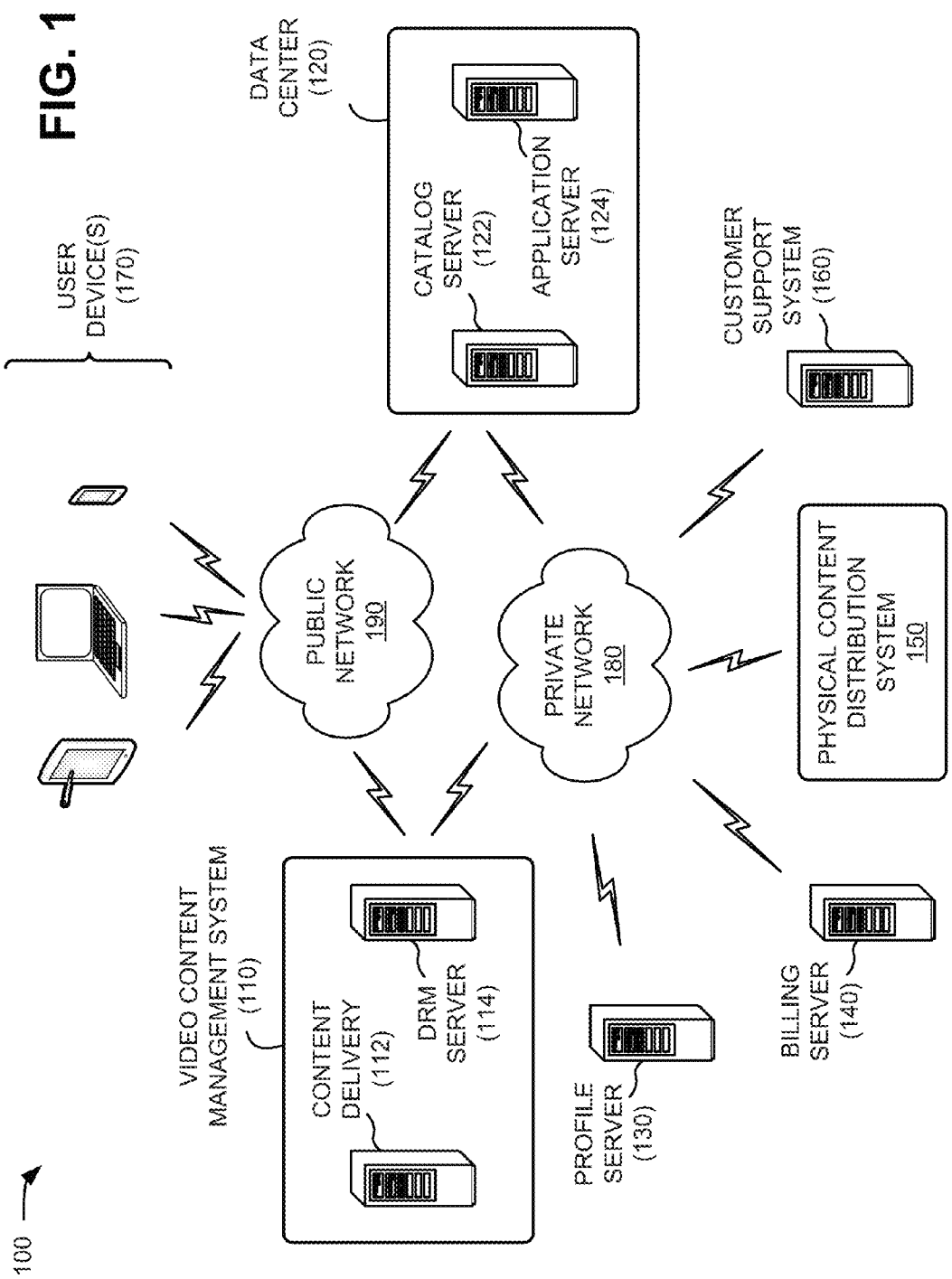
FIG. 1 is an exemplary network in which systems and/or methods described herein may be implemented.

FIG. 1 is an exemplary network 100 in which systems and/or methods described herein may be implemented. As illustrated, network 100 may include a video content management system (VCMS) 110, a data center 120, a profile server 130, a billing server 140, a physical content distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 140, physical content distribution systems 150, customer support systems 160, user devices 170, and/or networks 180/190. Components of network 100 may be connected via wired and/or wireless links.

VCMS 110 may aggregate content, process content, and distribute content. In one implementation, VCMS 110 may include a content delivery system 112 and a digital rights management (DRM) server 114. VCMS 110 may aggregate content and transcode content into a digital format suitable for consumption on particular user devices 110. For example, VCMS 110 may include a transcoding device to convert an audio, video, or graphic file from one format to another (e.g., from one bit rate to another bit rate, from one resolution to another, from one standard to another, from one file size to another, etc.). VCMS 110 may also encrypt data and communicate with DRM server 114 to enforce digital rights.

Content delivery system 112 may deliver digital content from a backend server to user devices 170. In one implementation, content delivery system 112 may include a streaming server that provides streaming data packets (e.g., via a streaming URL) to user devices 170 (e.g., via public network 190). In one implementation, a streaming URL may be session-based, such that each URL can be used only once for one user device 170 for security purposes.

DRM server 114 may issue, validate, and/or enforce DRM licenses to a device client, such as an application running on one of user devices 170. In implementations herein, DRM server 114 may communicate with user device 170 to authenticate a user of user device 170, the particular user device 170, and/or an application residing on user device 170. For example, DRM server 114 may request/receive login information associated with the user, and compare the login information with stored information to authenticate the user. Additionally, or alternatively, DRM server 114 may request/receive device information (e.g., a unique device identifier) associated with user device 170, and may compare the device information with stored information to authenticate user device 170.

Data center 120 may manage the authorization, selection, and/or purchase of multimedia content by a user of user devices 170. As shown in FIG. 1, data center 120 may include a catalog server 122 and an application server 124. In one implementation, data center 120 may be accessed by user devices 170 via public network 190.

Catalog server 122 may provide a unified catalog of both digital and physical content for users (e.g., of user devices 170) to order/consume (e.g., buy, rent, or subscribe). In one implementation, catalog server 122 may collect and/or present listings of content available to user devices 170. For example, catalog server 122 may receive digital and/or physical content metadata, such as lists or categories of content, from VCMS 110 and/or physical content distribution system 150. Catalog server 122 may use the content metadata to provide currently-available content options to user devices 170. Catalog server 122 may provide the content metadata to user device 170 directly or may communicate with user device 170 via application server 124.

Application server 124 may provide a backend support system for mobile applications residing on user devices 170. For example, application server 124 may permit user device 170 to download a video application that may permit a user to find content of interest or play downloaded or streaming content. The video application may enable user device 170 to present to a user of user device 170 information received from data center 120 in an interactive format to allow selection of particular digital or physical content. Application server 124 may provide content metadata, such as lists or categories of content for digital content, such as downloads and streaming content, and/or physical content, such as DVDs, Blu-ray discs, or memory cards. Application server 124 may provide the digital content in association with VCMS 110 and the physical content in association with physical content distribution system 150. Also, application server 124 may authenticate a user who desires to purchase, rent, or subscribe to digital or physical content. In one implementation, the interactions between application server 124 and user device 170 may be performed using the hypertext transfer protocol (HTTP) or the secure HTTP (HTTPS) via public network 190.

Application server 124 may provide the content in a cross-platform format that includes digital content and physical content in the same listings provided to user device 170. Application server 124 may provide content recommendations for a cross-platform system that includes online digital streaming/downloads of digital content and physical distribution of physical content. Application server 124 may provide recommendations to user devices 170 based on a user's consumption history, personal preferences, and feedback. Application server 124 may receive requests for content based on the recommendations and route the request among merged digital and physical content.

Additionally, application server 124 may provide recommendations to public physical content processing devices, such as kiosks (not shown), based on user profile information of a user indicated by a user account that is "logged on" and temporarily associated with the particular public physical content processing device. The physical content processing device may perform (with respect to receiving recommendations and selecting content based on the recommendations) as a user device 170 in this instance, and may associate digital content with a user account for later download to user devices 170.

Profile server 130 may store user profile information for users (e.g., users of user devices 170). The user profile information may include various information regarding a user, such as login information (e.g., a user identifier and a password), billing information, address information, types of services to which the user has subscribed, user ratings of content, user reviews of content, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. The user ratings of content and user reviews of content may be provided for content that is provided by the content provider. Alternatively, or additionally, the user ratings and user reviews may be provided for content that is related to content provided by the content provider. Application server 124 may use the user profile information from profile server 130 to authenticate a user and may update the user profile information based on the user's activity (e.g., with a user's express permission).

Billing server 140 may manage charging users for services provided via network 100. Billing server 140 may include, for example, a payment processing component, a billing component, and/or a settlement component.

Physical content distribution system 150 may track availability of physical content (e.g., DVDs, Blu-ray discs, memory cards, etc.) and provide metadata relating to the physical content for inclusion in catalog information provided to users of user devices 170. In one implementation, physical content distribution system 150 may also provide physical assets information, such as location information, so that when a user wants to buy a physical asset, the system can direct the user to the nearest location. Additionally, or alternatively, physical content distribution system 150 may generate or receive credit information for users (e.g., for cross-promotion purposes). For example, after a user of user device 170 has purchased a digital asset or subscription/rental, the user may be entitled some credits for getting physical asset or vice versa.

Customer support system 160 may solicit and/or receive user feedback, questions, or credit-related requests.

User device 170 may enable a user to view video content or interact with another user device 170 or a video display device (e.g., a set-top box and/or television). User device 170 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices. In one implementation, user device 170 may include a client-side application that enables user device 170 to communicate with, for example, data center 120 and/or present information received from data center 120 to a user. The client-side application may permit a user of user device 170 to log into an account (e.g., via application server 124), access catalog information (e.g., from catalog server 122), submit an order, and/or consume live streaming video content (e.g., from VCMS 110).

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that function to provide services to user devices 170.

In implementations described herein, recommendations of digital content and physical content may be provided to a user device 170 based on a user's consumption history, personal preferences, and feedback. Recommendations selected from among merged digital and physical contents may be routed to the appropriate platforms in a cross-platform content distribution system, to complete transactions for selected content.

Figure 2:
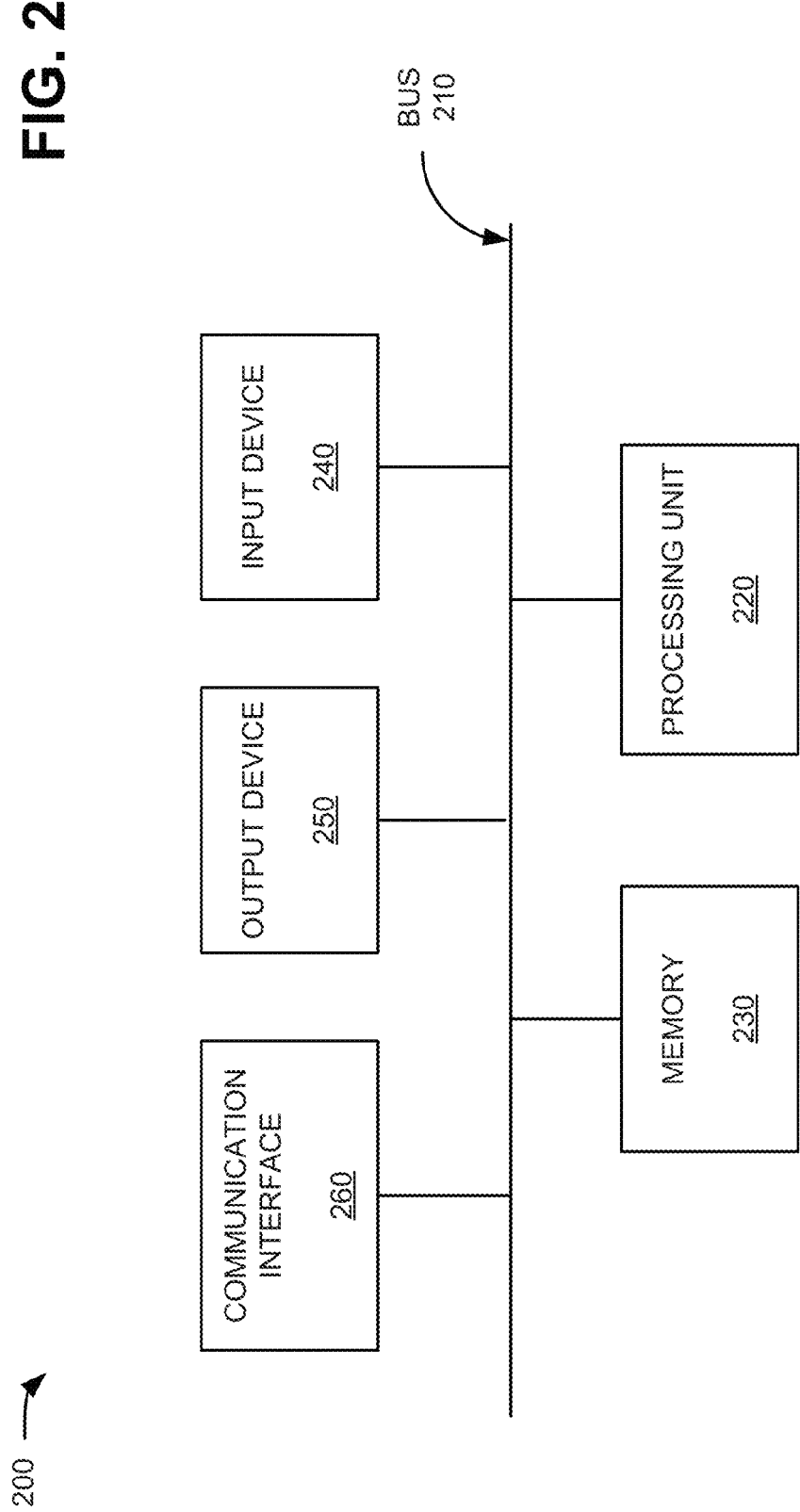
FIG. 2 is a block diagram of exemplary components of a device that may correspond to one of the devices of FIG. 1.

FIG. 2 is a diagram of exemplary components of a device 200 that may correspond to VCMS 110, content delivery system 112, DRM server 114, data center 120, catalog server 122, application server 124, profile server, billing server 140, physical content distribution system 150, customer support system 160, or user device 170. Each of VCMS 110, content delivery system 112, DRM server 114, data center 120, catalog server 122, application server 124, profile server 130, billing server 140, physical content distribution system 150, customer support system 160, and user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
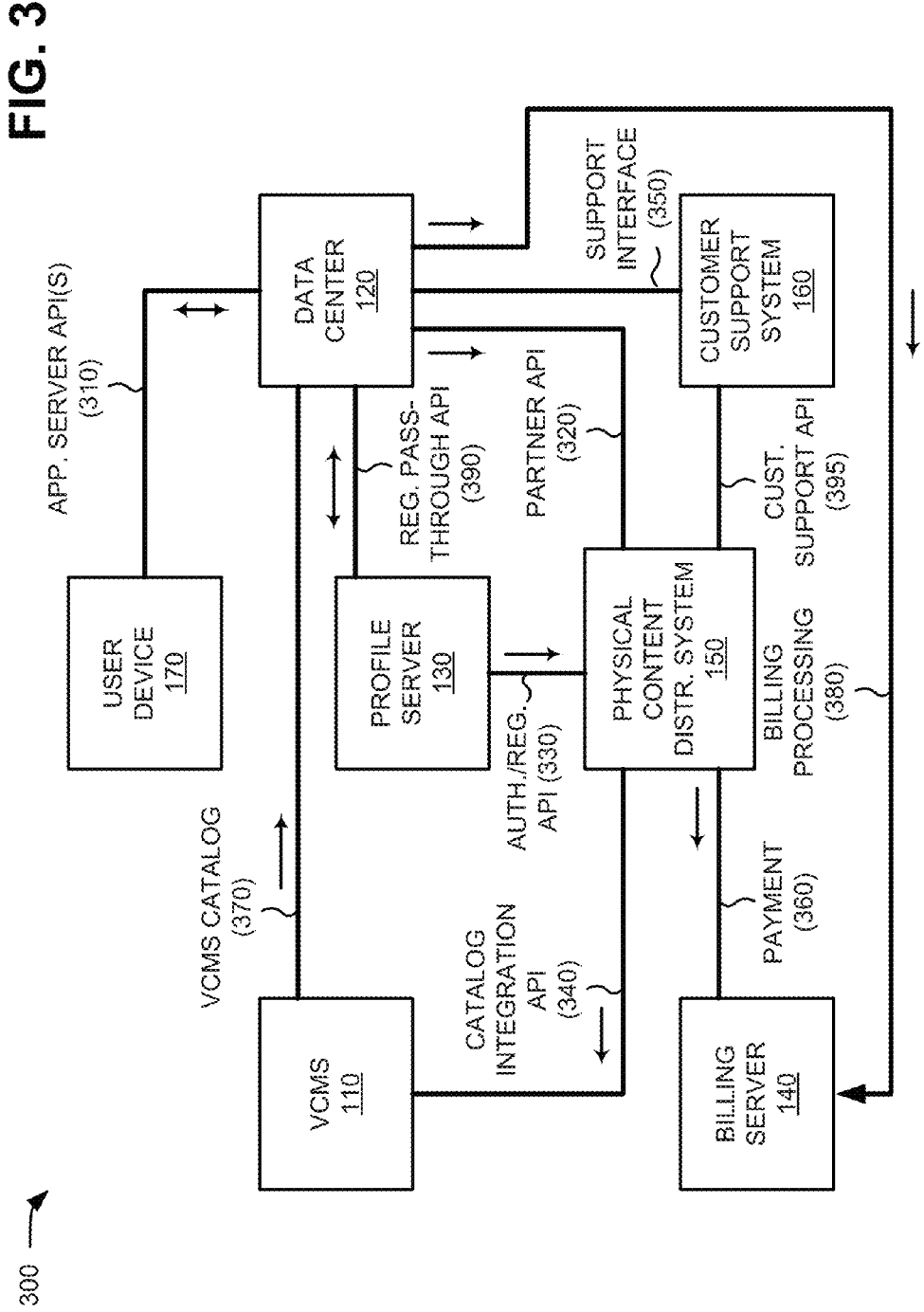
FIG. 3 is a block diagram of exemplary communications between components within a portion of the network of FIG. 1.

FIG. 3 is a diagram of exemplary communications for a portion 300 of network 100. Communications in FIG. 3 may represent communications to support content recommendations for a cross-platform content distribution system that may include physical assets and digital content. As shown in FIG. 3, network portion 300 may include VCMS 110, data center 120, profile server 130, billing server 140, physical content distribution system 150, customer support system 160, and user device 170. VCMS 110, data center 120, profile server 130, billing server 140, physical content distribution system 150, customer support system 160, and user device 170 may include features described above in connection with, for example, FIGS. 1 and 2. Although arrows in portion 300 indicate direction of information flows that support a content recommendation process, it should be understood that communications within network portion 300 may be implemented in different manners than indicated by the arrows.

As shown in FIG. 3, user device 170 may request and data center 120 may provide an application server application program interface (API) 310. Data center 120 (e.g., application server 124) may provide different APIs to user device 170 depending, for example, on the type of operating system included on user device 170. For example, application server API 310 may include a web (e.g., web 2.0) API, an Andriod® API, an iOS API, or a Windows Phone® API. Other APIs may be provided for other applications, such as television-embedded applications, smart appliances, etc. API 310 provided by the application server in data center 120 may enable user device 170 to view and/or order content from catalogs provided via data center 120. The content may be delivered in a cross-platform format and may include digital content, which may be associated with one platform (e.g., a platform associated with a first provider, such as a digital content provider) and managed using VCMS 110, and physical content, which may be associated with another platform (e.g. a platform associated with a physical content provider) and managed using physical content distribution system 150. Application server API 310 may provide recommendations for content, including digital content and/or physical content, to user device 170 based on a user's consumption history, personal preferences, and feedback received within network 100, for instance, as described hereinbelow with respect to FIGS. 5A-5C.

Data center 120 may provide a partner API 320 to physical content distribution system 150. Partner API 320 may include, for example, an interface to identify/update physical asset locations, conduct authentication and registrations, and/or exchange credit information (e.g., for cross-promotion purposes).

Profile server 130 may provide an authentication and registration API 330 to physical content distribution system 150. Authentication and registration API 330 may permit profile server 130 to register new users with physical content distribution system 150 or to initiate user authentication procedures for physical content distribution system 150. In the case of new user registrations, profile server 130 may collect user information from user device 170 (e.g., via application server 124) and provide the user information to physical content distribution system 150 to create an account in a physical content distribution system 150 database. In the case of authentications of existing user accounts, profile server 130 may collect user login information (e.g., a login name and password) from user device 170 (e.g., via application server 124) and provide the login information to physical content distribution system 150 for authentication. Assuming the user is authenticated by physical content distribution system 150, profile server 130 may generate a session token with a particular expiration time and send the session token to user device 170 (e.g., via application server 124) for future validation.

Physical content distribution system 150 may implement catalog integration API 340 to inform VCMS 110 of physical assets available to users of user devices 170. Physical content distribution system 150 may use catalog integration API 340 to provide catalog descriptions for physical media assets and/or metadata about content on the physical assets, such as titles, formats (e.g., DVD, Blu-ray disc, memory card, etc.), and descriptions. In one implementation, catalog integration API 340 may support delivery of an XML metadata file to VCMS 110.

Customer support system 160 may provide a support interface 350 to data center 120. For example, support interface 350 may include APIs to enable communications with customer support system 160. For example, support interface 350 may provide an avenue to report customer disputes (e.g., originating from user devices 170) from data center 120 to customer support system 160.

Billing server 140 may provide a payment gateway 360 to physical content distribution system 150. Payment gateway 360 may provide a secure system to apply charges (e.g., credit card payments) to a user's account in physical content distribution system 150 for physical content ordered via data center 120. Billing server 140 may also generate internal billing entries for digital content ordered by users and delivered via VCMS 110.

VCMS 110 may include VCMS catalog API 370 to export content metadata to data center 120. For example, VCMS 110 may combine information regarding available digital content (e.g., stored within VCMS 110) and catalog integration information received via catalog integration API 340 into a single unified catalog file. VCMS 110 may provide the unified catalog file to data center 120 using VCMS catalog API 370. VCMS 110 may also provide information identifying a provider and/or platform for each asset included in the unified catalog file. For example, VCMS 110 may provide identifiers in the unified catalog file for each asset that indicates an association of the asset with physical content distribution system 150, and/or an association with VCMS 110.

Data center 120 may provide billing processing information to billing server 140 via billing processing API 380. Billing processing information may include, for example, identification of and/or charges associated with content ordered by users of user devices 170. Billing processing API 380 may be used to support customer billing processes (e.g., for digital content) and fulfill payment transactions (e.g., for physical content).

Registration pass-through API 390 may provide a communication interface for data center 120 to exchange user registration and authentication information with profile server 130. Registration information may include, for example, user information (e.g., name, address, device identifiers, etc.) required to create an account for a user of user device 170. Authentication information may include, for example, information (e.g., a login name and password) to access a user's existing account. Data center 120 may pass registration/authentication information received from user device 170 to policy server 130, and policy server 130 may return validations to data center 120, via registration pass-through API 390.

Customer support API 395 may provide a communication interface to exchange information to resolve customer disputes. For example, customer support API may enable customer support system 160 to submit dispute information to and retrieve account information from physical content distribution system 150.

Although FIG. 3 shows exemplary interfaces between components of network portion 300, in other implementations, network portion 300 may include fewer interfaces, different interfaces, differently arranged interfaces, or additional interfaces than depicted in FIG. 3. Alternatively, or additionally, one or more interfaces of network portion 300 may perform one or more other tasks described as being performed by one or more other interfaces of network portion 300.

Figure 4:
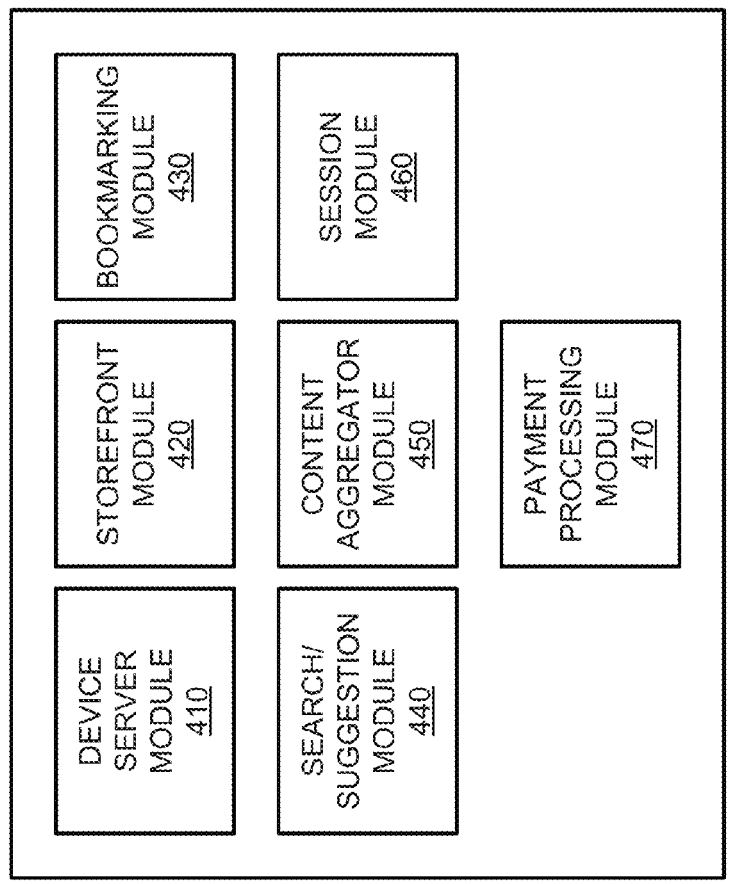
FIG. 4 is a diagram of exemplary functional components of the application server of FIG. 1.

FIG. 4 is a diagram of exemplary functional components of application server 124. In one implementation, the functions described in connection with FIG. 4 may be performed by one or more components of device 200 (FIG. 2). As shown in FIG. 4, application server 124 may include a device server module 410, a storefront module 420, a bookmarking module 430, a search/suggestion module 440, a content aggregator module 450, a session module 460, and a payment processing module 470.

Device server module 410 supports interactions between user devices 170 and backend servers, including (but not limited to) catalog server 122, content delivery system 112, and DRM server 114. Device server module 410 may determine which content format to use according to the device type or platform. Device server module 410 may also aggregate content from different servers according to requests from user devices 170. In one implementation, device server module 410 may also temporarily cache some content locally for performance purposes.

Storefront module 420 provides a user interface to enable users to review and select content in a variety of formats, including digital content and physical content. Storefront module 420 may support browsing and searching of the catalog (e.g., a unified catalog compiled by catalog server 122) from user devices 170. Storefront module 420 may also provide an electronic shopping cart, transaction management, and/or promotions and advertisements.

Bookmarking module 430 tracks user viewing position (e.g., within particular digital content) and allows users of user devices 170 to view the content from the most recently viewed position. In one implementation the most recently viewed portion may be based on the viewing from the same user device 170. In another implementation the most recently viewed portion may be based on the user account (e.g., regardless of the particular user device 170). For example, when a user starts to view a video, bookmarking module 430 may asks a user where to start the presentation, the beginning or where it was stopped from last time.

Search/suggestion module 440 provides a user interface to enable a user to search the catalog by keywords or review content suggestions or recommendations. Search/suggestion module 440 may provide recommendations for content based on based on the user's search terms, profile, viewing history, previously purchased content, or feedback, such as a resource availability indication, received from within network 100. Resource availability indications may be provided to search/suggestion module 440 based on a determined availability of resources required to fulfill a particular user request. For example, search/suggestion module 440 may recommend particular content to the user. Search/suggestion module 440 may also recommend physical assets based on the digital viewing history or personal preferences.

Content aggregator module 450 aggregates information from Internet searching and social networks related to particular content (e.g., a program or video) for a user to view and share. In one implementation, content aggregator module 450 may provide links or other menu options to enable a user to select related content provided by content aggregator module 450.

Session module 460 receives user login information and forwards the user login information to policy server 130 for validation. For example, session module may collect user login information from user device 170 and forward the login information to policy server 130. Assuming the user is authenticated (e.g., by policy server 130 or physical content distribution system 150), session module 460 may receive a session token and send the session token to user device 170.

Payment processing module 470 may include an interface with billing server 140 to bill the customer for the transaction of a purchase, a rental or a subscription. In one implementation, payment processing module 470 may also include a credit exchange interface with physical content distribution system 150. For example, when a user purchases digital content, coupon credits for getting physical media (e.g., DVDs or Blu-ray discs), may be deposited to a user's account associated with physical content distribution system 150.

Figure 5:
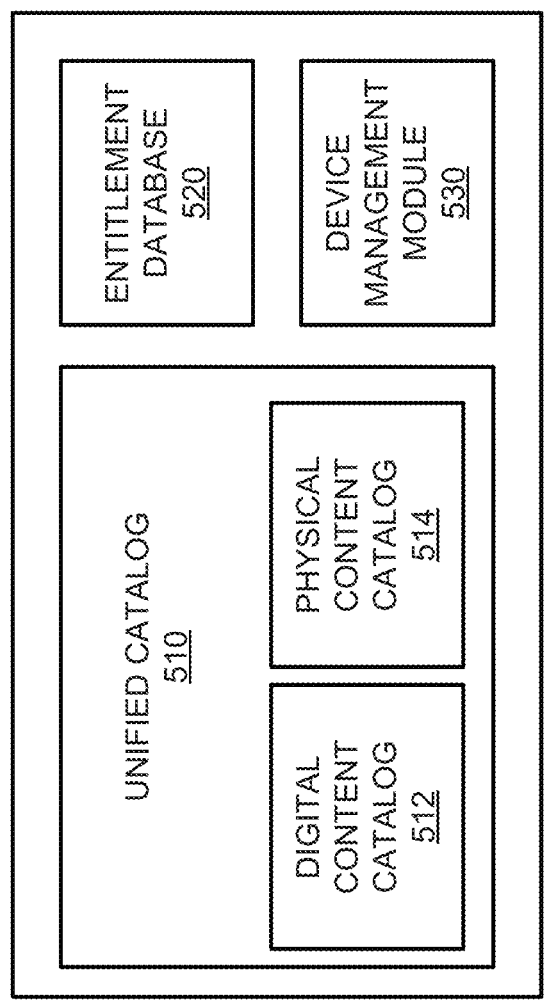
FIG. 5 is a diagram of exemplary functional components of the catalog server of FIG. 1.
Figure 6B:
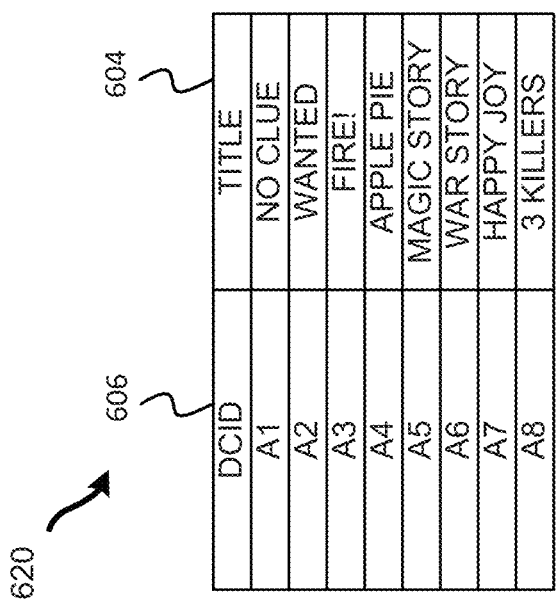
FIG. 6B is a diagram of an exemplary table of a digital content catalog.
Figure 6C:
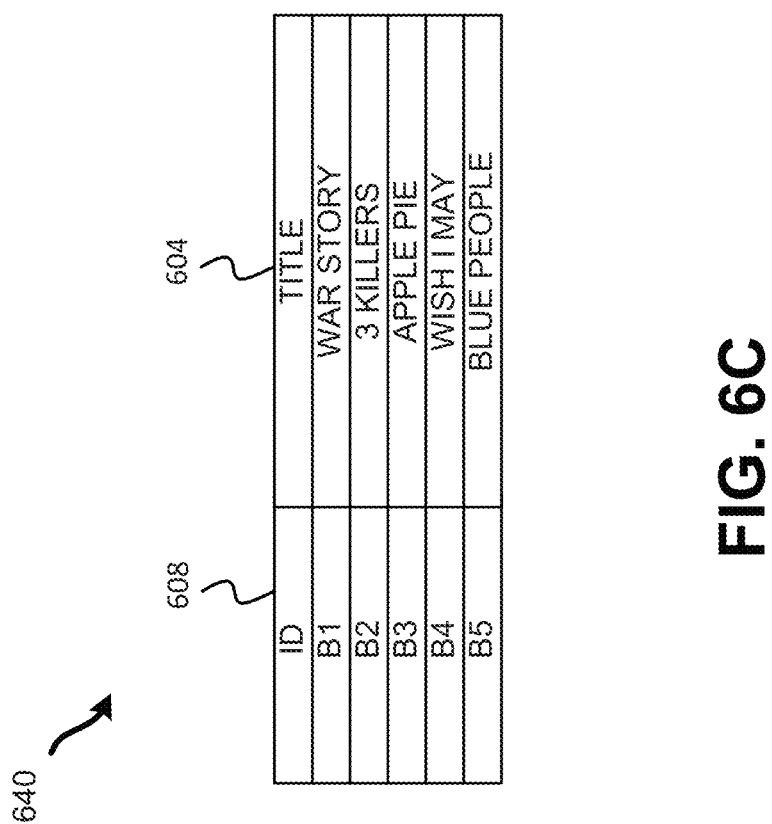
FIG. 6C is a diagram of an exemplary table of a physical content catalog.

FIG. 5 is a diagram of exemplary functional components of catalog server 122. In one implementation, the functions described in connection with FIG. 5 may be performed by one or more components of device 200 (FIG. 2). As shown in FIG. 5, catalog server 122 may include a unified catalog 510, an entitlement database 520, and a device management module 530. FIGS. 6A, 6B and 6C are tables showing exemplary information contained in unified catalog 510, digital content catalog 512, and physical content catalog 514, respectively, and although described with respect to catalog server 122, unified catalog 510, digital content catalog 512, and physical content catalog 514 may be implemented in other parts of network 100.

Unified catalog 510 includes the unified catalog of both digital content and physical content available for all users to buy, rent or subscribe. Unified catalog 510 may include a digital content catalog 512 and a physical content catalog 514. In one implementation, unified catalog 510 may be received from VCMS 110 and updated at periodic intervals.

According to one implementation, as shown in FIG. 6A, unified catalog 510 may be stored in a table 600 that includes a combined identifier (CID) 602 for all content, including both digital content and physical content, available for users. Each asset in table 600 is assigned with a unique CID 602. Unified catalog 510 may also include a title 604 for each content asset, e.g. "No Clue", "Wanted", etc. Unified catalog 510 may also include a digital content ID (DCID) 606 that indicates each asset available in digital content catalog 512, and/or a physical content ID (PCID) 608 that indicates each asset available in physical content catalog 514.

Digital content catalog 512 includes digital content available for all users to buy, rent or subscribe. Digital content catalog 512 may include a digital content identifier for each digital asset. Digital content catalog 512 may also include routing information for digital transactions, such as commands to route transactions regarding the recommended digital content to billing server 140.

According to one implementation, as shown in FIG. 6B, digital content catalog 512 may identify digital content and may be stored in a table 620 that includes DCID 606 for each digital content asset. Each digital content asset in table 620 is assigned with a unique DCID 606. Digital content catalog 512 may also include a title 604 for each digital content asset.

Physical content catalog 514 includes physical content available for all users to buy, rent or subscribe. Physical content catalog 514 may include a physical content identifier for each physical asset. Physical content catalog 514 may also include routing information for physical transactions, such as commands to route transactions regarding the recommended physical content to billing server 140.

According to one implementation, as shown in FIG. 6C, physical content catalog 514 may include physical content and may be stored in a table 640 that includes PCID 606 for each physical content asset. Each physical content asset in table 640 is assigned a unique PCID 608. Physical content catalog 514 may also include a title 604 for each digital content asset.

Digital content catalog 512 and physical content catalog 514 may be associated with different entities, although provided in unified catalog 510, e.g., different business entities in a cross-promotional business relationship. There may be a certain percentage of duplicate titles 604 between table 620 that includes digital content catalog 512 and table 640 that includes physical content catalog 514. The IDs (606, 608) assigned to the content are unique and separate for each type of content. The different business entities may conduct different business processes when providing the digital content assets and the physical content assets via network 100.

Entitlement database 520 includes entitlement profiles for particular users. An entitlement profile may associate particular user devices 170 or platforms with particular types of content. Entitlement database 520 has entitlement rules associated with a user's profile and may indicate terms of usage associated with content, such as a right to transfer, a limited duration (i.e., rental) rights, etc. In one implementation, profiles in entitlement database 520 may be added/deleted/changed by a user via interactions with application server 124.

Device management module 530 associates unified catalog 510 with a user's entitlement profile in entitlement database 520 to enforce what content the user can view on which device. For example, if a user bought a particular movie, the user may be able to view the movie on only certain user devices 170 (e.g., a television, a personal computer, and/or or registered mobile devices). In one implementation, device management module 530 may verify entitlement before a DRM license can be issued to the user device 170.

Figure 7:
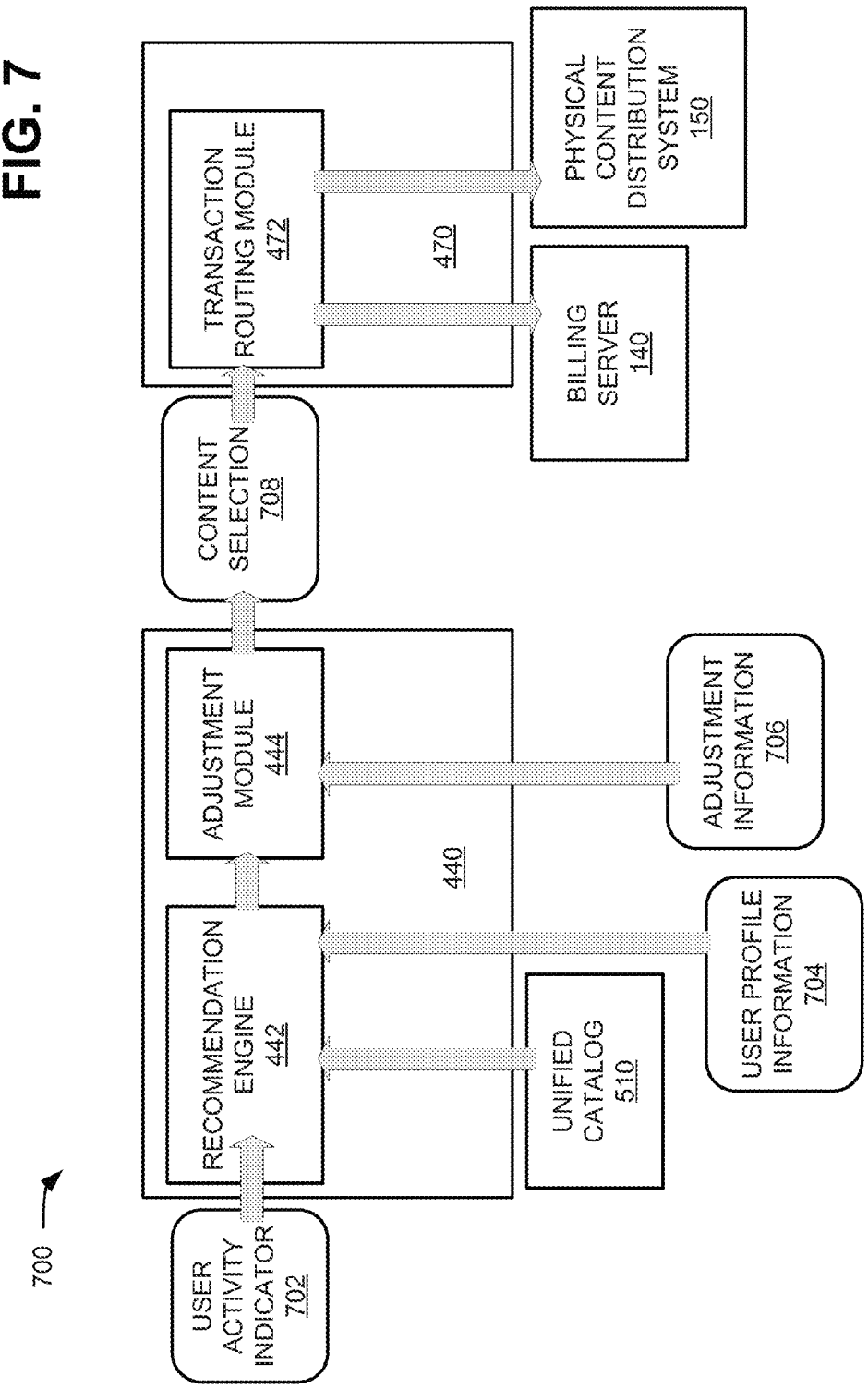
FIG. 7 is an exemplary functional block diagram of a portion of a network used for recommending content consistent with embodiments described herein.

FIG. 7 is a recommended transaction data flow diagram 700 for a portion of network 100 that supports recommendations for a cross-platform system and transactions based on the recommendations. As shown in FIG. 7, recommended transaction data flow 700 may include a portion of application server 124, such as search/suggestion module 440 and payment processing module 470, billing server 140, and physical content distribution system 150.

As shown in FIG. 7, search/suggestion module 440 may determine content recommendations for a user based on a user activity indicator 702 received from a user device 170. User activity indicator 702 may include an indication of general user activity that may be generated by user device 170 when a user "signs on" to a user device 170 and/or user device 170 accesses a specific interface, such as a user interface for selecting content. User activity indicator 702 may also include an indication of content specific activity, such as when a user browses, rents, and/or purchases particular content, etc.

Search/suggestion module 440 may include a recommendation engine 442 that determines a recommendation based on user activity indicator 702. Recommendation engine 442 may request and receive a unified catalog 510, for example from catalog server 122. Unified catalog 510 may include digital content catalog 512 and physical content catalog 514.

Recommendation engine 442 may also receive user profile information 704, for example from profile server 130, based on an identification of the user. User profile information 704 may include various information regarding a user, such as described above with respect to profile server 130 and FIG. 1. Recommendation engine 442 may determine one or more content recommendations based on user activity indicator 702, unified catalog 510, and user profile information 704. For example, recommendation engine 442 may identify content in user catalog 510 that a user may be most likely to select based on user profile information 704, such as previously viewed or purchased content, etc. Alternatively, recommendation engine 442 may determine the content recommendations based on particular content accessed by the user. The content recommendations may include a predetermined number of content assets, for example, three most likely selections.

According to one implementation, recommendation engine 442 may determine content recommendations, and an order of ranking of recommendations for the content, based on plot points associated with the content, and other factors that indicate that the user is likely to select the recommended content, such as a date of release of the film, actors, quality ratings for the film (such as awards), etc. Plot points may include heist, "the fight between evil and good", themes, such as love, revenge, superheroes, etc. For example, recommendation engine 442 may determine that plot points for a particular film include "quirky slapstick comedy" and "unlikely heroes". Recommendation engine 442 may determine a group of recommendable films in unified catalog 510 that meet a minimum threshold for recommendation based on the plot points for the particular film, e.g., films that include "quirky slapstick comedy" or plot points that a viewer of a film with "quirky slapstick comedy" are likely to select or enjoy, for example, films that include "bumbling villains".

Recommendation engine 442 may select a subgroup of the recommendable films that have a closest recommendable plot point correlation with the particular film. The closest recommendable plot point correlation may be determined based on analysis of viewing habits, and responses to recommendations, of users with similar viewing histories, demographics, etc. For example, recommendation engine 442 may use a multi-vector matrix to determine similarity between a particular movie or general viewing habits of the user, and prospective recommended content. The multi-vector matrix may include multiple plot points that are assigned different values based on an estimated importance of a particular theme, etc., to a film or viewer. For example, "love" may be assigned five units in the multi-vector matrix for a particular film, while "tragedy", "karma" and "mystery" may be assigned one unit each in the multi-vector matrix for the particular film. Recommendation engine 442 may select a recommended film that has plot points of "love", "karma" and "mystery" assigned two units each.

In some implementations, recommendation engine 442 may choose the order of generation of recommendations based on demographics of a user. For example physical content may have a higher weighting than digital content for older users.

Search/suggestion module 440 may also include a recommendation adjustment module 444 that adjusts the content recommendations determined by recommendation engine 442 based on the status of resources associated with providing the recommended content. For example, recommendation adjustment module 444 may receive the content recommendations from recommendation engine 442. Adjustment module 444 may also receive adjustment information 706. Adjustment information 706 may be information that indicates the status of resources that provide the recommended content in network 100, including conditions that affect a preferred order of recommendation for content.

According to one implementation, if a prospective recommended asset is a physical content asset, adjustment information may include a relative location, with respect to a user's preferred base location or the user's GPS location, as indicated for instance by user device 170, of a physical store/kiosk that may provide the prospective physical content asset to a user. Physical content assets that are not within a particular range, (e.g., of distance from user device 170 or preferred locations) may be replaced in the content recommendations by other physical content assets that are within the particular range. Additionally, or alternatively, adjustment module 444 may adjust the content recommendation based on availability of the recommended content at a preferred physical store. The preferred physical store may be indicated by previous user indication, or by the frequency of previous transactions from the preferred physical store.

According to another implementation, if a prospective recommended asset is a digital content asset, adjustment information may include a load of particular streaming server(s) that may provide the digital content asset. Digital content assets that are provided by streaming servers that have a particular load (e.g., based on a predetermined threshold or a relative load of streaming servers for different recommended digital content assets) may be replaced in the content recommendations by other digital content assets that are provided by streaming servers at a lower load.

Search/suggestion module 440 may provide the content recommendations (or adjusted content recommendations) to user device 170. User device 170 may receive the content recommendations and display the content recommendations so that a user of user device 170 may select content based on the content recommendations. User device 170 may receive a content selection 708, input by a user of user device 170, and send content selection 708 to payment processing module 470.

As shown in FIG. 7, payment processing module 470 may include a transaction routing module 472. Transaction routing module 472 may route transactions for the content based on the particular type of content (digital content or physical content) in network 100. Payment processing module 470 may receive an ID for the content and determine an appropriate platform for delivering the content. For example, payment processing module 470 may route the transaction to billing server 140 for digital content. Alternatively, payment processing module 470 may route the transaction to physical content distribution system 150 for physical content.

Figure 8:
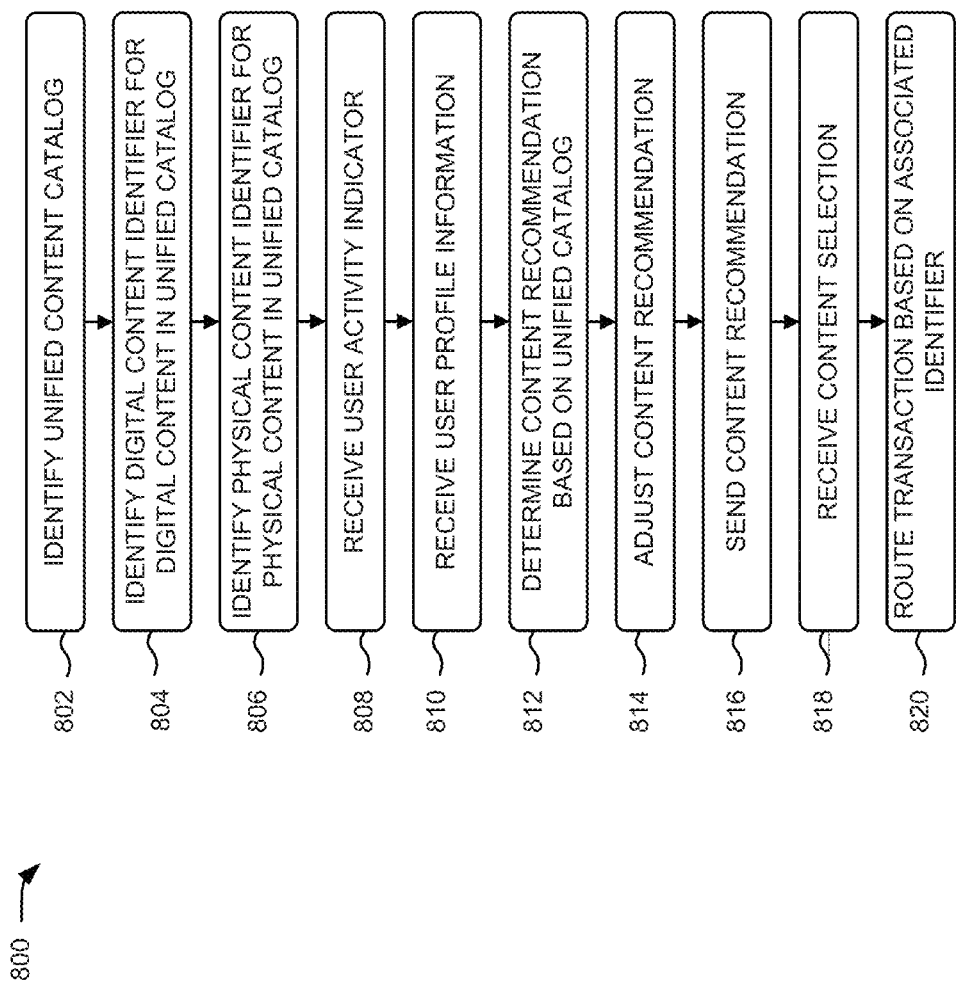
FIG. 8 is a flow chart of an exemplary process for providing content recommendations according to an implementation described herein.

FIG. 8 is a flow chart of an exemplary process for recommending content according to implementations described herein. Process 800 is described with respect to tables 600, 620, and 640, shown in FIGS. 6A, 6B, and 6C, respectively, for illustrative purposes. In one implementation, process 800 may be performed by application server 124. In another implementation, some or all of process 800 may be performed by another device or group of devices, including or excluding application server 124.

As shown in FIG. 8, application server 124 may identify unified catalog 510 (block 802). For example, application server 124 may receive unified catalog 510 from VCMS 110. Unified catalog 510 may include digital content available to order, for example, from one content provider/service provider and physical content available to order, for example, from another content provider/service provider.

Unified catalog 510 may include a CID 602 for each unique media asset. For example, as described with respect to FIG. 6A, each media asset may be identified by a single unique CID 602 (e.g., "Apple Pie" has a CID 602 of C4) for a media asset is available digital content and/or physical content. If both a digital copy and a physical copy are available for a particular single asset, the ID assigned for that single asset in table 640 is different from the ID assigned in table 620. VCMS 110 may merge the contents from table 620 and table 640 in table 600. Only a single record of each asset is kept for duplicated assets. Original IDs assigned by table 620 and 640 are also included in table 600 as additional columns. VCMS 110 may send unified catalog 510 to application server 124.

At block 804, application server 124 may identify a DCID 606 for digital content available from unified catalog 510. For example, application server may assign a unique DCID 606 for each digital content asset in unified catalog 510. Alternatively, application server 124 may receive the DCIDs 606 from VCMS 110.

At block 806, application server 124 may identify a PCID 608 for physical content available from unified catalog 510. For example, application server may assign a unique PCID 608 for each physical content asset in unified catalog 510. Alternatively, application server 124 may receive the PCIDs 608 from physical content distribution system 150.

Application server 124 may receive a user activity indicator 702 from user device 170 (block 808). For example, user device 170 may generate a user activity indicator when the user activates user device 179 and/or connects to network 100, etc. Alternatively, user device 170 may generate a user activity indicator in response to user accessing (e.g., browsing, renting, or purchasing) content.

Application server 124 may receive user profile information 704 (block 810). For example, profile server 130 may send user profile information in response to a request from application server 124. Alternatively, profile server 130 may send user profile information 704 in response to a directed request from user device 170.

Application server 124 may determine one or more content recommendations based on the user activity indication (block 812). For example, application server 124 may determine content recommendations based on particular content accessed by user device 170. The content recommendations may be a list of content from unified catalog 150 that have a relatively high probability (in contrast to other content in unified catalog 510) of being selected by the user. Additionally or alternatively, application server 124 may determine the content recommendations based on user profile information 704.

Application server 124 may adjust the content recommendations (block 814). Application server 124 may request adjustment information from the providers of the prospective recommended content assets. For example, if the recommended content includes digital content available from a particular server, application server 124 may send a message to the server requesting information regarding a relative load of the server. The server may send load information that application server 124 may use to determine a preferred order of content recommendations. For example, if the streaming server indicates a relatively high load, application server 124 may remove the asset from the content recommendations and replace the asset with content that may be more readily provided (e.g., the particular replacement asset may be provided by a less heavily loaded streaming server).

Application server 124 may provide the content recommendations to user device 124 (block 816). Alternatively, application server 124 may provide the adjusted content recommendations to user device 170.

At block 818, application server 124 may receive a content selection from user device 170. For example, user device 170 may send a content selection based on the provided content recommendations (816), input by the user of user device 170, for example, using a GUI of user device 170.

Application server 124 may route an order for the selected content based on an associated identifier for the content (block 820). For example, application server 124 may route the order as described below with respect to process 900 and FIG. 9.

Figure 9:
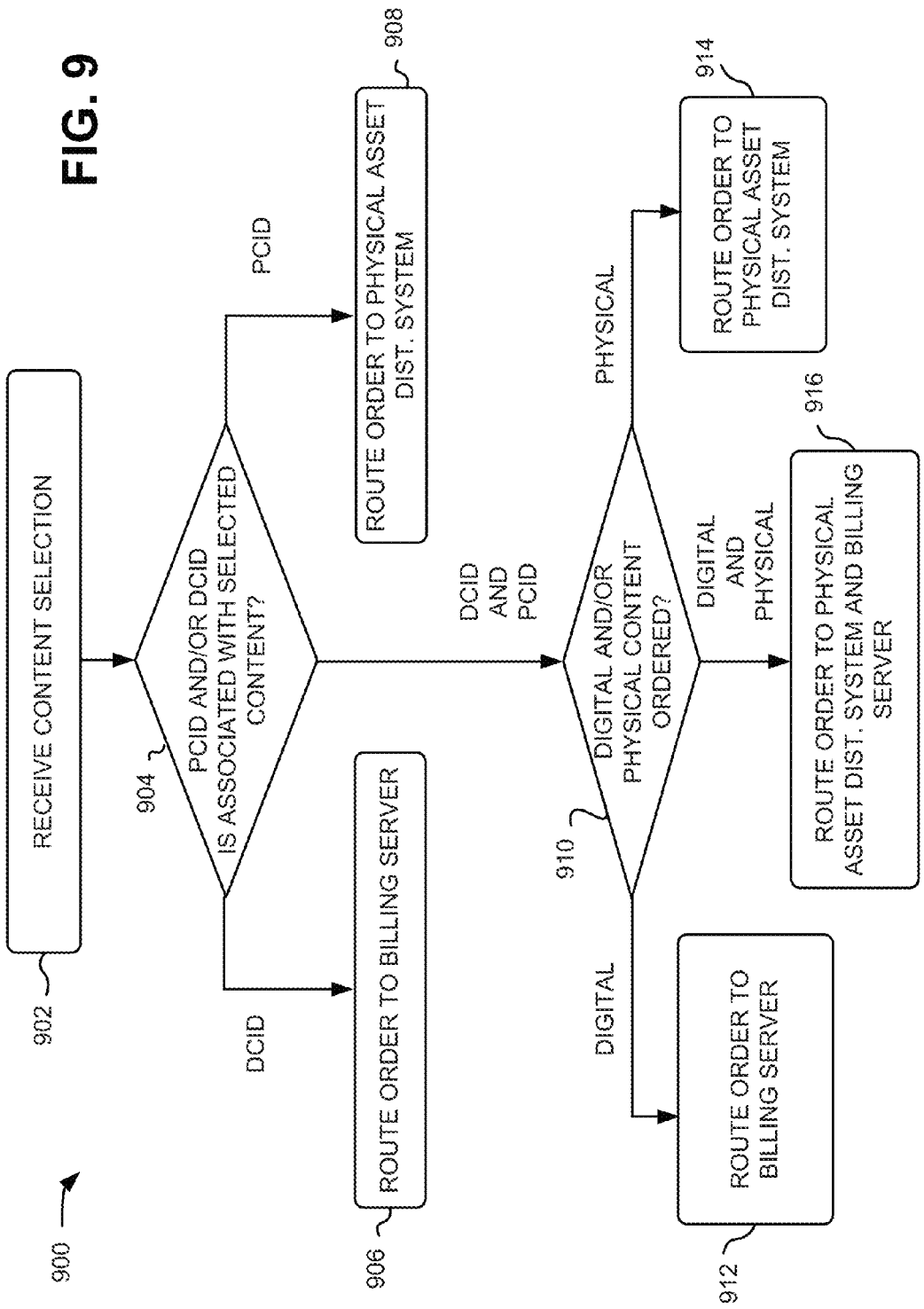
FIG. 9 is a flow chart of an exemplary process for routing an order according to an implementation described herein.

FIG. 9 is a flow chart of an exemplary process for routing an order for selected content according to implementations described herein. In one implementation, process 900 may be performed by application server 124. In another implementation, some or all of process 900 may be performed by another device or group of devices, including or excluding application server 124.

At block 902, application server may receive a content selection from user device 170. For example, application server 124 may receive a request for content (e.g., a movie) based on the provided content recommendations.

At block 904, application server may determine an identifier associated with the selected content. For example, application server 124 may determine whether a DCID 606, a PCID 608, or both a DCID 606 and a PCID 608 are associated with the selected content. In other words, application server 124 determines whether the user has selected digital content or physical content. Application server 124 may route a transaction for the selected content based on a particular DCID 606 and/or PCID 608 associated with the selected content.

If application server 124 determines that the identifier associated with the selected content is a DCID 606 (block 904), application server 124 may route an order for the selected content to billing server 140 (block 906). In this instance, the recommended content is only available as digital content, which may be indicated to the requesting user. Billing server 140 may implement business processes and logic provided by a content provider for the digital content.

If application server 124 determines that the identifier associated with the selected content is a PCID 608 (block 904), application server 124 may route an order for the selected content to physical content distribution system 150 (block 908). Physical content distribution system 150 may implement business processes and logic provided by a content provider for the physical content.

If application server 124 determines that identifiers associated with the selected content are both a DCID 606 and a PCID 608 (block 904), application server 124 may determine a type of content ordered by the user (block 910). In this instance, the requesting user may have selected digital content and/or physical content via network 100, e.g., using user device 170.

If application server 124 determines that the content type ordered by the user is digital content (block 910), application server 124 may route an order for the selected content to billing server 140 (block 912). Billing server 140 may implement business processes and logic provided by a content provider for the digital content.

If application server 124 determines that the content type ordered by the user is physical content (block 910), application server 124 may route an order for the selected content to physical content distribution system 150 (block 914). Physical content distribution system 150 may implement business processes and logic provided by a content provider for the physical content.

If application server 124 determines that the content type ordered by the user is both digital and physical content (block 910), application server 124 may route an order to physical content distribution system 150 for the physical content and to billing server 140 for the digital content (block 916). Business processes for the digital content and the physical content may be executed independently. Billing server 140 may implement business processes and logic provided by a content provider for the digital content. Physical content distribution system 150 may implement business processes and logic provided by a content provider for the physical content.

Systems and/or methods described herein may allow user devices to provide recommendations for a cross-platform system that include online digital streaming/downloads and physical distribution of physical content, such as DVDs, Blu-ray discs, or memory cards. Recommendations may be provided to users based on a user's consumption history, personal preference and feedback. Recommendations may be routed among merged digital and physical content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   identifying at least one digital content identifier for each asset of digital video content available from a digital content catalog associated with a digital content distribution system, wherein the digital content catalog lists digital content items provided by a digital content business entity;
   identifying at least one physical content identifier for each asset of physical video content available from a physical content catalog associated with a physical content distribution system, wherein the physical content catalog lists physical content items provided by a physical content business entity that is a different business entity than the digital content business entity;
   combining the digital content catalog and the physical content catalog into a unified catalog of content, wherein the unified catalog of content includes a combined identifier for each asset that is available to order as at least one of digital content or physical content;
   receiving an indication of user activity from a user device associated with a user;
   determining one or more content recommendations based on the unified catalog and the indication of user activity;
   providing the one or more content recommendations from the unified catalog to the user device;
   receiving a content selection based on the one or more content recommendations, wherein the content selection includes the combined identifier; and
   routing an order for the selected content based on the combined identifier and at least one identifier associated with the combined identifier to the digital content distribution system for items from the digital content catalog and to the physical content distribution system for items from the physical content catalog, wherein the at least one identifier is selected from one or both of the at least one physical content identifier and the at least one digital content identifier.

2. The computer-implemented method of claim 1, wherein routing the order for the selected content further comprises:
   determining whether the content selection is associated with one or both of the at least one physical content identifier and the at least one digital content identifier;
   when the content selection is associated with the at least one digital content identifier, routing the order to a billing server for digital content;
   when the content selection is associated with the at least one physical content identifier, routing the order to the physical content distribution system;
   when the content selection is associated with the at least one physical content identifier and the at least one digital identifier, routing the order to the physical content distribution system and the billing server for digital content, wherein the physical content distribution system and the billing server for digital content process the orders independently.

3. The computer-implemented method of claim 1, further comprising:
   receiving user profile information for a user of the user device, wherein the user profile information includes one or more of billing information, address information, types of services to which the user has subscribed, user ratings, user reviews, a list of content purchased by the user, a list of content rented by the user, or a list of content to which the user has subscribed; and
   wherein the content recommendations are determined based on the unified catalog and the user profile information.

4. The computer-implemented method of claim 1, further comprising:
adjusting the one or more content recommendations based on the status of resources associated with providing the recommended content.

5. The computer-implemented method of claim 4, wherein the recommended content comprises digital content and the status of resources associated with providing the recommended content includes a relative server load of a server that provides the recommended content.

6. The computer-implemented method of claim 4, wherein the recommended content comprises physical content and the status of resources associated with providing the recommended content includes a relative distance of a physical store that provides the recommended content from a location associated with the user.

7. The computer-implemented method of claim 4, wherein adjusting the content recommendations based on the status of resources associated with providing the recommended content further comprises:
one or more of lowering a ranking of the recommended content or removing the recommended content from the content recommendations.

8. The computer-implemented method of claim 1, wherein determining content recommendations based on the unified catalog and the indication of user activity further comprises:
determining an order of recommendation based on one or more of plot points, genres, actors, and directors associated with the content.

9. The computer-implemented method of claim 1, wherein determining content recommendations based on the unified catalog and the indication of user activity further comprises:
determining demographics of the user;
determining a weighting for the physical video content based on the demographics of the user; and
providing the weighting for the physical video content based on the demographics of the user.

10. A device, comprising:
a memory to store a plurality of instructions; and
a processor configured to execute instructions in the memory to:
identify at least one digital content identifier for each asset of digital video content available from a digital content catalog associated with a digital content distribution system, wherein the digital content catalog lists digital content items provided by a digital content business entity;
identify at least one physical content identifier for each asset of physical video content available from a physical content catalog associated with a physical content distribution system, wherein the physical content catalog lists physical content items provided by a physical content business entity that is a different business entity than the digital content business entity;
combine the digital content catalog and the physical content catalog into a unified catalog of content, wherein the unified catalog of content includes a combined identifier for each asset that is available to order as at least one of digital video content or physical video content;
receive a request for recommendation from a user device associated with a user;
determine one or more content recommendations based on the unified catalog and the request for recommendation;
provide the one or more content recommendations from the unified catalog to the user device;
receive a content selection based on the one or more content recommendations, wherein the content selection includes the combined identifier; and
route an order for the selected content based on the combined identifier and at least one identifier associated with the combined identifier to the digital content distribution system for items from the digital content catalog and to the physical content distribution system for items from the physical content catalog, wherein the at least one identifier is selected from one or both of the at least one physical content identifier and the at least one digital content identifier.

11. The device of claim 10, wherein, when routing the order for the selected content, the processor is further configured to:
determine whether the content selection is associated with one or both of the at least one physical content identifier and the at least one digital content identifier;
when the content selection is associated with the at least one digital content identifier, route the order to a billing server for digital content;
when the content selection is associated with the at least one physical content identifier, route the order to the physical content distribution system; and
when the content selection is associated with the at least one physical content identifier and the at least one digital content identifier, route the order to the physical content distribution system and the billing server for digital content, wherein the physical content distribution system and the billing server for digital content process the orders independently.

12. The device of claim 10, wherein the processor is further configured to:
receive user profile information for a user of an account associated with the user device, wherein the user profile information includes one or more of billing information, address information, types of services to which the user has subscribed, user ratings, user reviews, a list of content purchased by the user, a list of content rented by the user, or a list of content to which the user has subscribed; and
wherein the one or more content recommendations are determined based on the unified catalog and the user profile information.

13. The device of claim 10, wherein the processor is further configured to:
adjust the one or more content recommendations based on the status of resources associated with providing the recommended content.

14. The device of claim 13, wherein the recommended content comprises digital content and the status of resources associated with providing the recommended content includes a relative server load of a server that provides the recommended content.

15. The device of claim 13, wherein the recommended content comprises physical video content and the status of resources associated with providing the recommended content includes one or more of a relative distance of a physical store that provides the recommended content from a location associated with the user, or availability of the recommended content at a preferred physical store based on previous user indication.

16. The device of claim 13, wherein, when adjusting the one or more content recommendations based on the status of resources associated with providing the recommended content, the processor is further configured to:
one or more of lower a ranking of the recommended content or remove the recommended content from the one or more content recommendations.

17. The device of claim 10, wherein, when determining one or more content recommendations based on the unified catalog and the indication of user activity, the processor is further configured to:
determine an order of the one or more content recommendations using a multi-vector matrix of plot points associated with the content.

18. A non-transitory computer-readable medium including instructions to be executed by a processor, the instructions including one or more instructions, when executed by the processor, for causing the processor to:
identify at least one digital content identifier for each asset of digital video content available from a digital content catalog associated with a digital content distribution system, wherein the digital content catalog lists digital content items provided by a digital content business entity;
identify at least one physical content identifier for each asset of physical video content available from a physical content catalog associated with a physical content distribution system, wherein the physical content catalog lists physical content items provided by a physical content business entity that is a different business entity than the digital content business entity;
combine the digital content catalog and the physical content catalog into a unified catalog of content, wherein the unified catalog of content includes digital video content available to order and physical video content available to order;
receive an indication of user activity from a user device associated with a user;
determine one or more content recommendations based on the unified catalog and the indication of user activity;
adjust the one or more content recommendations based on the status of resources associated with providing the recommended content;
provide the one or more content recommendations to the user device;
receive a content selection based on the one or more content recommendations, wherein the content selection includes the combined identifier; and
route an order for the selected content based on the combined identifier and at least one identifier associated with the combined identifier to the digital content distribution system for items from the digital content catalog and to the physical content distribution system for items from the physical content catalog, wherein the at least one identifier is selected from one or both of the at least one physical content identifier and the at least one digital content identifier.

19. The non-transitory computer-readable medium of claim 18, wherein, when routing the order for the selected content based on the at least one identifier associated with the selected content, the one or more instructions further includes instructions to:
determine whether the content selection is associated with one or both of a physical content identifier and a digital content identifier;
when the content selection is associated with a digital content identifier, route the order to a billing server for digital content;
when the content selection is associated with a physical content identifier, route the order to a physical content distribution system; and
when the content selection is associated with a physical content identifier and a digital content identifier, route the order to the physical content distribution system and the billing server for digital content, wherein the physical content distribution system and the billing server for digital content process the orders independently.

20. The non-transitory computer-readable medium of claim 18, wherein the recommended content comprises digital content and the status of resources associated with providing the recommended content includes a relative server load of a server that provides the recommended content.

* * * * *